United States Patent
Gizis et al.

(10) Patent No.: US 9,686,232 B2
(45) Date of Patent: Jun. 20, 2017

(54) NETWORK ADDRESS TRANSLATING ROUTER FOR MOBILE NETWORKING

(71) Applicant: Connectify, Philadelphia, PA (US)

(72) Inventors: Alex Gizis, Philadelphia, PA (US); Brian Lutz, Philadelphia, PA (US); Brian Prodoehl, Philadelphia, PA (US)

(73) Assignee: Connectify, Inc., Philadelphia, PA (US)

( * ) Notice: Subject to any disclaimer, the term of this patent is extended or adjusted under 35 U.S.C. 154(b) by 616 days.

(21) Appl. No.: 13/926,227

(22) Filed: Jun. 25, 2013

(65) Prior Publication Data

US 2013/0346620 A1 Dec. 26, 2013

Related U.S. Application Data

(60) Provisional application No. 61/663,910, filed on Jun. 25, 2012.

(51) Int. Cl.
*G06F 15/16* (2006.01)
*H04L 29/12* (2006.01)

(52) U.S. Cl.
CPC ...... *H04L 61/2503* (2013.01); *H04L 61/2061* (2013.01); *H04L 61/2535* (2013.01); *H04L 61/2015* (2013.01); *H04L 61/2514* (2013.01)

(58) Field of Classification Search
CPC ............. H04L 61/2503; H04L 61/2061; H04L 61/2535; H04L 61/2015; H04L 61/2514
USPC .................................................. 709/226, 217
See application file for complete search history.

(56) References Cited

U.S. PATENT DOCUMENTS

| | | | | |
|---|---|---|---|---|
| 6,892,245 | B1 * | 5/2005 | Crump | H04L 29/12066 709/223 |
| 7,127,524 | B1 * | 10/2006 | Renda | H04L 29/12 709/223 |
| 2008/0075096 | A1 * | 3/2008 | Wagner | H04L 29/12509 370/401 |
| 2008/0129817 | A1 * | 6/2008 | Faubel | H04N 7/148 348/14.08 |
| 2009/0040942 | A1 * | 2/2009 | Yang | H04L 12/2602 370/253 |
| 2013/0117443 | A1 * | 5/2013 | Zhang | H04L 41/0896 709/224 |
| 2013/0332983 | A1 * | 12/2013 | Koorevaar | H04L 63/20 726/1 |

* cited by examiner

*Primary Examiner* — Bryan Lee
*Assistant Examiner* — Oluwatosin Gidado
(74) *Attorney, Agent, or Firm* — Stradley Ronon Stevens & Young, LLP

(57) ABSTRACT

A Network Address Translating ("NAT") Router, particularly designed for mobile use, and for managing one or more local area networks, having private internet protocol ("IP") address ranges, along with multiple "upstream" networks, and for efficiently routing communications traffic to and from the upstream networks, is disclosed. The inventive router allocates multiple network connections of varying quality, to automatically optimize the effective connection speed in a mobile client network with optional personal "hotspot" sub-networks. The inventive NAT router is also capable of managing IP address allocation on local networks to substantially avoid conflicts with other networks encountered in normal use.

18 Claims, 5 Drawing Sheets

NETWORK ADDRESS TRANSLATING ROUTER FOR MOBILE NETWORKING

CROSS REFERENCE TO RELATED APPLICATIONS

This application claims priority to U.S. Provisional Application No. 61/663,910, filed on Jun. 25, 2012, the contents of which are incorporated by reference herein, in their entirety and for all purposes.

FIELD OF THE INVENTION

The present invention relates generally to the field of computer networks and routers, and in more particularity, relates to a network address translating ("NAT") router for mobile use and managing at least one local area network having private internet protocol ("IP") address ranges, along with a plurality of upstream networks. The inventive NAT router efficiently routes communications traffic with the upstream networks, and optimizes connection speed in a mobile client network along with optional personal "hotspot" sub-networks. The inventive NAT router is also capable of managing IP address allocation on local networks to substantially avoid conflicts with other networks encountered in normal use.

TECHNICAL BACKGROUND OF THE INVENTION

Computers are able to communicate with other computers and systems only when such devices are "connected" together as part of a communications network. The Internet is one such communications network. A primary advantage of the Internet is that is a world-wide, and widely used network, and therefor can connect computers together that may be located anywhere in the world. Other types of communications networks include local area networks ("LAN"), which are private networks, often created to connect a limited number of trusted computers, usually in an office or home setting. Another type of network is a wide area network ("WAN") that typically provides communication access to the Internet using a wireless radio protocol.

There are many different reasons for wanting to connect one or more remote computers to a LAN. By way of example, a LAN is often secure, and it may contain important corporate resources at the office, or contain one's personal media files in a home environment. Usually in conjunction with a private LAN, a device known as a Network Address Translating ("NAT") Router will manage the network connections between (a) multiple devices (logical or physical) on the LAN and (b) an "upstream" connection to another network that typically leads eventually to the Internet.

FIG. 1A illustrates a typical prior art Network Address Translating Router 100. FIG. 1A shows the general physical architecture of such a system. In this configuration, the Network Address Translator/Router 102 is connected to a series of client devices 104 through a local area network 106. The NAT 112 is connected to the local area network via a local adapter 108. The NAT views all traffic on the LAN, and any traffic it deems routable will be accepted into the NAT 112 for address translation. This translation involves taking the network address of the LAN 106 and creating a socket-for-socket translation that is native to the "upstream" network 114. The network 114 is also accessed via a local adapter 108, which may be of the same type as used for the local network 106. The upstream network will generally connect to one or more servers 116.

From the point of view of each server 116, the client LAN 106 appears to be one or more clients on a directly accessible network 114. However, traffic from server network 114 is only passed back to the specific client 104 based upon the stored translations of addresses maintained in the NAT 112. In other words, if an address is not known to the NAT 112, it will not be granted access to the local network 106.

FIG. 1B illustrates another example of a prior art network configuration. In this example, the network architecture is looking at the IP addresses rather than physical connections, and may focus on a single client 104 making connections to the upstream network. As shown in FIG. 1B, the client 104 is connected to a LAN 106 shared with the NAT Router 102. As an alternative, the NAT Router 102 may also communicate with other clients similar to client 104, through LAN 106. Traffic from the LAN 106 handled by the NAT router 102 is mapped or translated to a range of addresses appropriate to or recognized by the server's network. If such mapping were on the internet, such mapping could entail an extremely large range of legal addresses.

In at least one mode, the NAT router described above, can be used to support the inventive architecture relying on a class of NAT known as a "symmetric NAT." More particularly, as shown in FIG. 1B, a client network connection 132, which has a specific address and port, is given a unique translation address 136 for accessing the particular server 116 in question. A new and unique address and port 136 is assigned for each new address and port on the LAN 106. In this configuration, the address and port 136 is sent to a specific address and port 140 on the corresponding server 116. Given this mapping, only a return from the address and port 140 on the upstream network 138 will ever be mapped back to the original address and port on the client 106. While this is one example of a prior art configuration, the application and scope of the inventive router is not limited to symmetric NATs, but is one type of configuration supported by the inventive router.

Although not specifically illustrated, another task of the NAT router is to create a safe IP address range for any of the client LANs 106 that are managed by the router. For some router setups, the NAT address range will be manually configured by the IT personnel. In other configurations, the router will use an IP address range from a number of legal "private network" ranges (e.g., ranges guaranteed to not be on the internet, and reserved only for private networks).

To improve the technology of NAT routers, a number of additional features have been designed for use with a NAT router system. Particularly when used in a mobile context, it would be advantageous to use multiple upstream connections where possible. This also allows for intelligent routing over different connections as their quality changes either through, by way of example simple usage, or through mobility of the router. Making the router more "connection-aware" allows these decisions to be made efficiently and effectively. For use in personal networks, the NAT router should be more intelligent in the selection and assignment of IP address ranges, given that the router will typically not always by connected to the internet, and may have to contend with other NAT routers. The selection and assignment process for IP address ranges needs to occur automatically and without professional personnel or human intervention. Moreover, such selection and assignment needs to be able to change dynamically, without re-starting or rebooting the personal network.

SUMMARY OF THE INVENTION

The basic elements and attributes of the inventive NAT Router are to manage a LAN or LANs having private IP address ranges while co-existing with multiple "upstream" networks, and to automatically and efficiently route traffic to and from the upstream networks as needed. In an exemplary embodiment, the inventive router may embed the NAT in a personal computer or other similar mobile devices such as smartphones, tablets, or other similar devices. A primary aspect of the inventive router is to be able to access multiple, independent networks, where such networks are typically accessed by application-processing equipment such as personal computers. By way of one preferred example, the inventive router may be installed within a small computer dedicated as stand-alone router, so long as the router is capable of communicating with multiple simultaneous networks.

The inventive NAT router is capable of (a) monitoring bandwidth across multiple network interfaces, (b) appropriately selecting LAN address ranges that do not conflict with upstream networks currently in use or likely to be used in the same session, and (c) communicating network communications information to the system user. The address selection process reduces the potential that any of the managed personal area networks ("PANs") will need to reset address ranges (which detrimentally breaks all connections) as the device is moved from location to location and between different upstream opportunities.

More particularly, the present invention overcomes the disadvantages of the prior art and fulfills the needs described above by providing, in a preferred embodiment, a computer hosted network address translating router, comprising (a) a network address translating router; (b) a host computer communicatively connected to said network address translating router; (c) a plurality of local network adapters, each said local network adapter communicatively connected to said network address translating router; (d) a plurality of client devices, each said client device communicatively connected to a first subset of said local network adapters; (e) at least one remote network, each said remote network communicatively connected to a second subset of said local network adapters; and (f) at least one remote server, each said remote server communicatively connected to said at least one remote network; wherein said network address translating router manages network traffic to and from said at least one remote network and said at least one remote server by reassigning network connections, without restarting the networking connections, if said network connections fail, become unavailable, or degrade in performance.

Another embodiment of the present invention is a method for a computer hosted network address translating router to select internet protocol ("IP") address ranges, said method comprising the steps of (a) determining the last used IP address; (b) comparing said last used IP address against a listing of IP addresses not to be used; (c) comparing said last used IP address against a listing of historically used upstream IP addresses; (d) if said last used IP address is not on said listing of IP addresses not to be used or said listing of historically used upstream IP addresses, then said network address translating router uses said last used IP address; (e) if either said last used IP address is on said listing of IP addresses not to be used or said listing of historically used upstream IP addresses, then randomly selecting a new IP address; and (f) comparing said randomly selected new IP address against said listing of IP addresses not to be used; (g) comparing said randomly selected new IP address against a listing of historically used upstream IP addresses; (h) if said randomly selected new IP address is not on said listing of IP addresses not to be used or said listing of historically used upstream IP addresses, then said network address translating router uses said new IP address; and (i) if either said randomly selected new IP address is on said listing of IP addresses not to be used or said listing of historically used upstream IP addresses, then returning to step (d) and again random selecting a new IP address.

BRIEF DESCRIPTION OF THE DRAWINGS

In the drawings, which form a part of this specification, include the following.

Other features and advantages of the present invention are provided in the following detailed description of the invention, which refers to the accompanying drawings.

DETAILED DESCRIPTION OF PREFERRED EMBODIMENTS

The present invention discloses and teaches preferred embodiments of methods and systems for a Network Address Translating ("NAT") Router that is design to effectively and efficiently handle the demands of mobile personal LANs. Within this design capability, the inventive NAT Router is capable of (a) managing network traffic across multiple upstream LAN connections, (b) handling connections that fail or that may become unreliable, and (c) managing LAN connections that may become available, and then become unavailable, all without the need to restart the LAN.

Figure 1A:
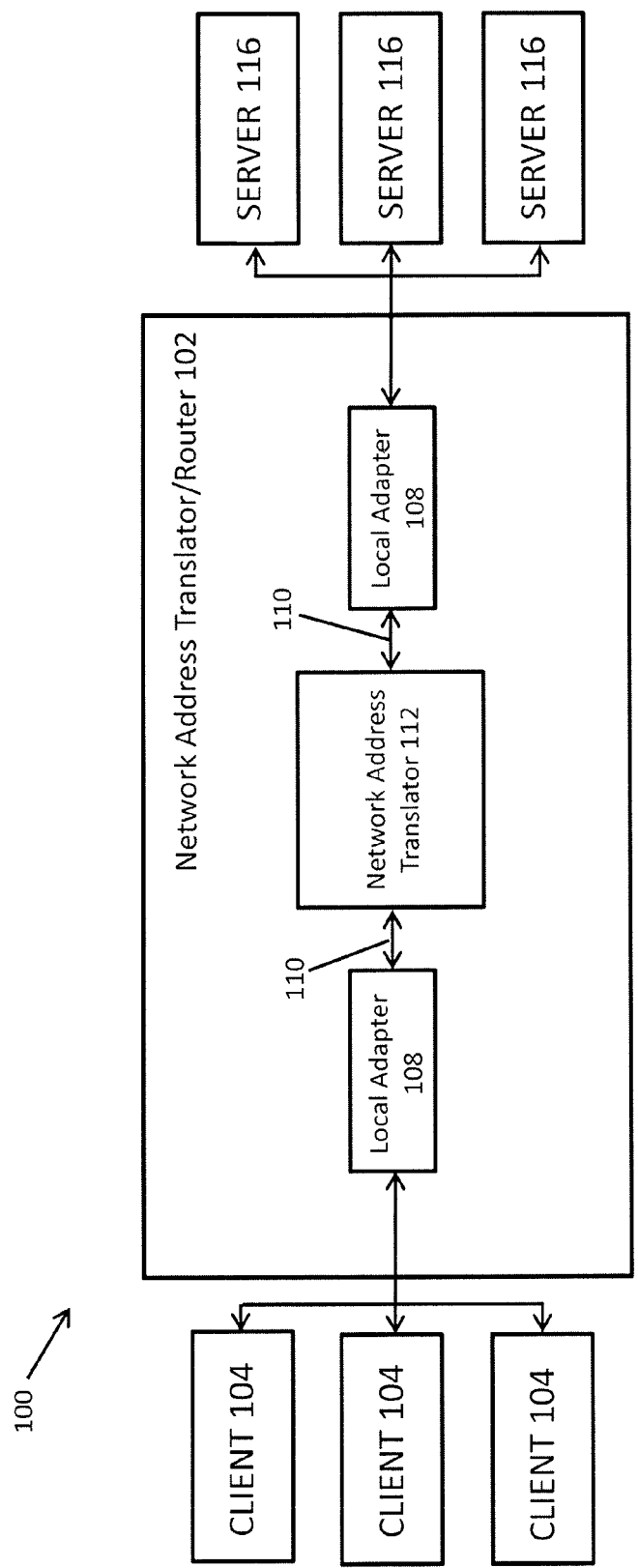
FIG. 1A shows an example prior art network address translator/router configuration.
Figure 1B:
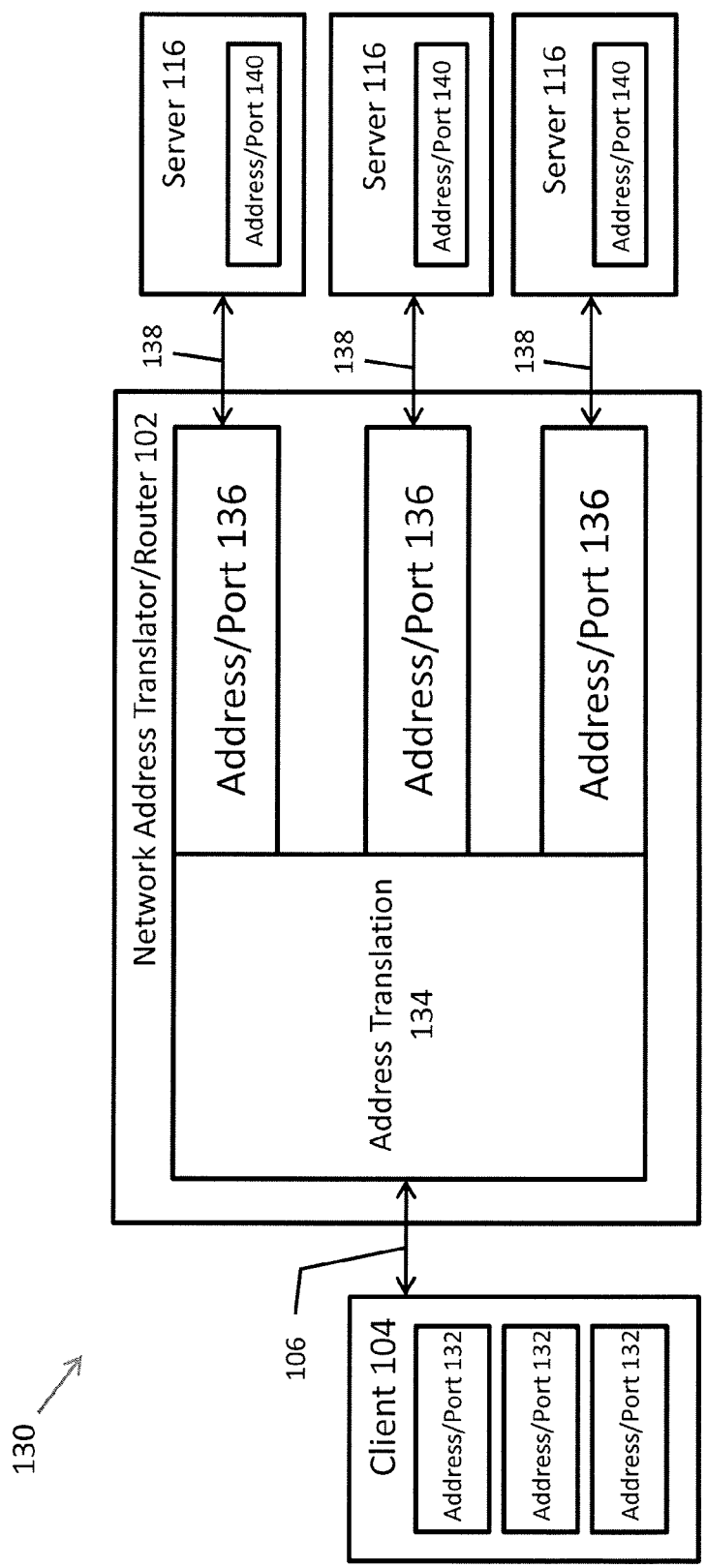
FIG. 1B shows another example prior art network address translator/router configuration.
Figure 2:
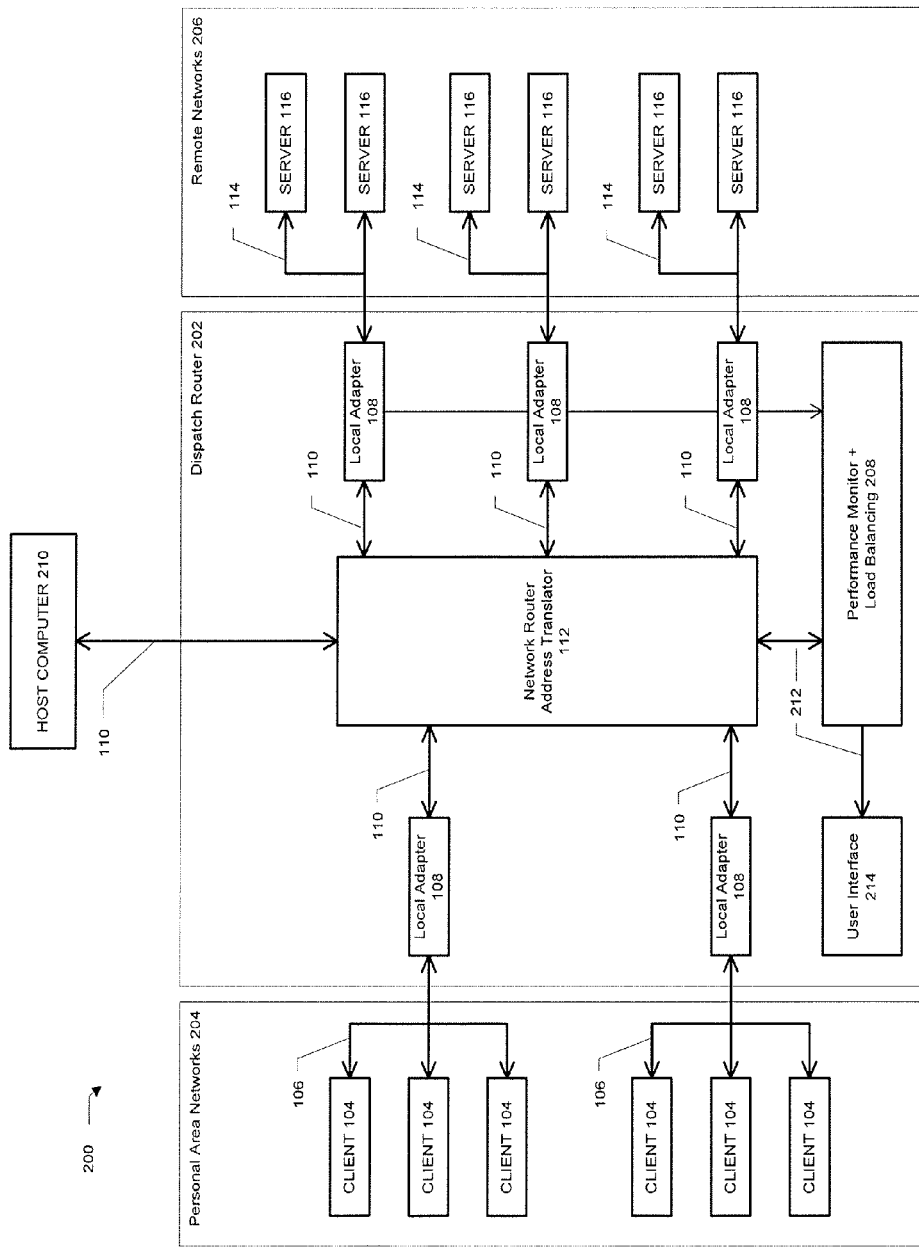
FIG. 2 illustrates an exemplary embodiment of the physical architecture of the inventive NAT Router.

A diagram of an exemplary embodiment of the inventive NAT router 200 is shown in FIG. 2. Similar to the connections shown in FIGS. 1A and 1B, the inventive router consists of a plurality of local network adapters 108, which can share a LAN 106 with multiple client devices 104. Since the inventive router 200 is running on a computer, it necessarily will have a virtual port 110 for the host computer 210. Network traffic from the host computer 210 is also routed through the NAT router 200, thus allowing local PC traffic to see the same load balancing advantages.

The inventive system typically will include one or more personal area networks ("PAN") 204, although such PANs are not required as part of the inventive systems and routers. All PANs are networks that can be directly managed by the inventive router. As designed the inventive router provides a virtual switch (as needed by the network type), a dynamic host configuration protocol ("DHCP"), and other services independently to each PAN. The inventive router also routes each PAN though the NAT for upstream access. A PAN may be an Ethernet, 802.11, Bluetooth, IEEE1394, or any other network 106 based upon the physical media local adapter 108 running the IP network protocol.

Similar to the prior architectures described, there is also an upstream LAN connection, but the inventive router is designed to be able to access any number of local adapters 108 for multiple parallel upstream connections. Each local adapter 108 is connected to a separate remote network 114. While these networks 114 may ultimately connect or communicate with the internet or some other common network, the route-ability of a particular connection to a selected server 116 establishes the use or disuse of a particular adapter 108. The PAN 204 is a network managed by the inventive router, while the Remote Network 206 communicates with the inventive router such that the inventive router is a normal client. The same kind of adapter 108 may be used for either type of network.

Another element and aspect of the inventive router, as shown in FIG. 2, is the system performance monitor and load balancing 208. The inventive system is knowledgeable of the expected performance of each upstream interface. As compared to the expected performance levels, there are the actual performance levels of the upstream interfaces, which may vary as a function of signal conditions, network traffic, interference, and other similar metrics. The performance monitor and load balancing element 208 collects the actual performance data from each interface, and maintains an average of each interface's performance.

In one exemplary embodiment, the performance and load balancing element 208 may determine and maintain a running average of performance. This performance monitoring data is used by the router 112, and is also supplied to the user via a User Interface 214. By way of one example, the User Interface 214 offers various performance data in different simplified formats, including performance graphs over time for each interface, and a simple indicator of when the system throughput exceeds that of any single interface.

Figure 3:
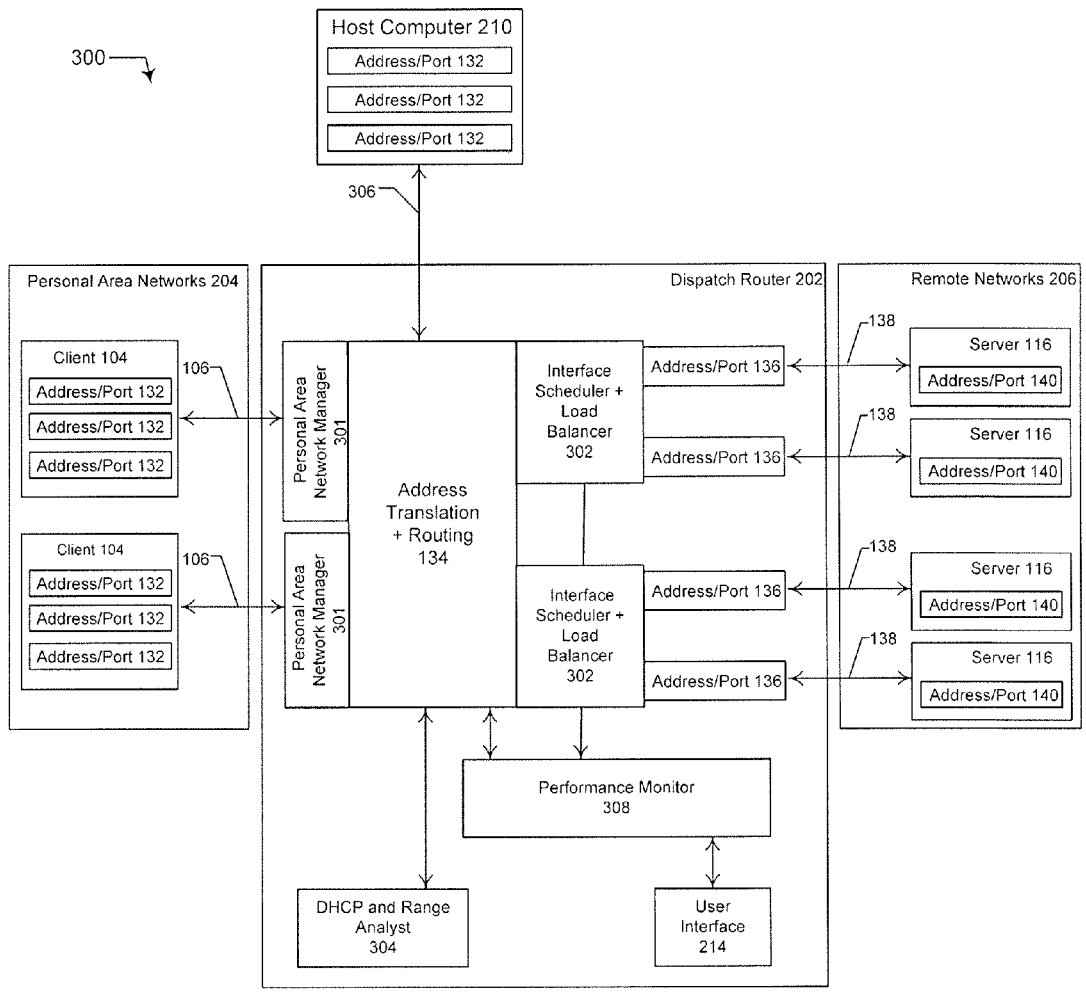
FIG. 3 illustrates an exemplary embodiment of the logical architecture of the inventive NAT Router.

Another diagram of an exemplary embodiment of the inventive router 300 is illustrated in FIG. 3. Similar to the processing used in a prior art NAT 102, packets not bound for the LAN are accepted by the router and translated to the IP space of the targeted network, which may be the host computer 210, any device on any of a plurality of PANs 204, or potentially a remote network 206 accessible via the upstream networks 138. Similarly, traffic from the host computer 210 is routed and translated to any PAN 204 or is routed to one or more of the remote networks 206 via the upstream connections 138.

PANs 204 may connect to and use the inventive router to provide certain management services 301. Such management services may include DHCP or other network address allocation protocols, and may also include virtual switch/routing for any traffic remaining on each specific PAN, which does not need the NAT layer of routing. When packets that originate from a device on the PAN 204 address resources off the PAN, the NAT router 134 will normally route this traffic to other PANs, to the host computer 210, or via the scheduler and load balancer 302, to one or more upstream networks 138 and then onto the final Remote Network 206.

For any upstream access, each address/port socket 132 is scheduled on one of the multiple physical network interfaces 306. This scheduling is used to balance the load for increased performance across all active interfaces, and also to dynamically move traffic away from connections that are not performing or have failed. As part of the translation function, the interface scheduler and load balancer 302, work with the mapping function to determine and report the performance of every interface in use. The performance monitor 308 reports the running load on each interface back to the scheduler, and to advise the translator/scheduler 134/302 of the next "best" interface to use.

The NAT router 134 used in the inventive system also provides performance data to the performance monitor 308. By way of example, new socket connections can occur quite rapidly in a busy system, but it may take time for traffic to actually appear on any completed connection. To avoid problems with scheduling based on this slow start phenomenon, an estimated load is immediately added to the interface load score for any new connection. Over time, the real traffic will replace the estimated traffic in the performance monitor 308 calculations for that connection.

While the primary work of the performance monitor 308 is monitoring and determining actual traffic, the monitor 308 may also evaluate the relative expense of the particular interface. This evaluation allows the system to use a lower cost connection for the bulk of the network traffic when such a lower cost connection may be available, but also allows the system to alter the connection and use a more expensive interface if the lower cost connection becomes bogged down or faulty.

Similar to the connection shown in FIG. 2, data from the performance monitor 308 is available to the user in user-friendly form through the user interface 214. By way of example, such performance data may include per interface traffic graphing, or a simple indicator of performance exceeding that of any single interface.

As described above, and shown in FIG. 2, the dispatch router 202 assigns IP address ranges to the necessary client devices 104. In an exemplary embodiment of the present inventive router, the system manages both the local network 106 and the wireless network 204. An advantageous aspect of the inventive router is the intelligent allocation of the IP address range handled by the DHCP and Range Analyst 304 element. By way of example, the host network and router may be operating on a mobile device, such as a laptop computer. As the laptop relocates or moves, there would normally be a need to change the IP address range to avoid upstream conflicts. Without the inventive router and intelligent allocation of IP address ranges (from the DHCP and Range Analyst 304), there would normally be a need to completely reboot the network, which could result in lost work, information, or resources. The inventive router addresses and solves that mobility problem by selecting the best range of private addresses to allocate.

Figure 4:
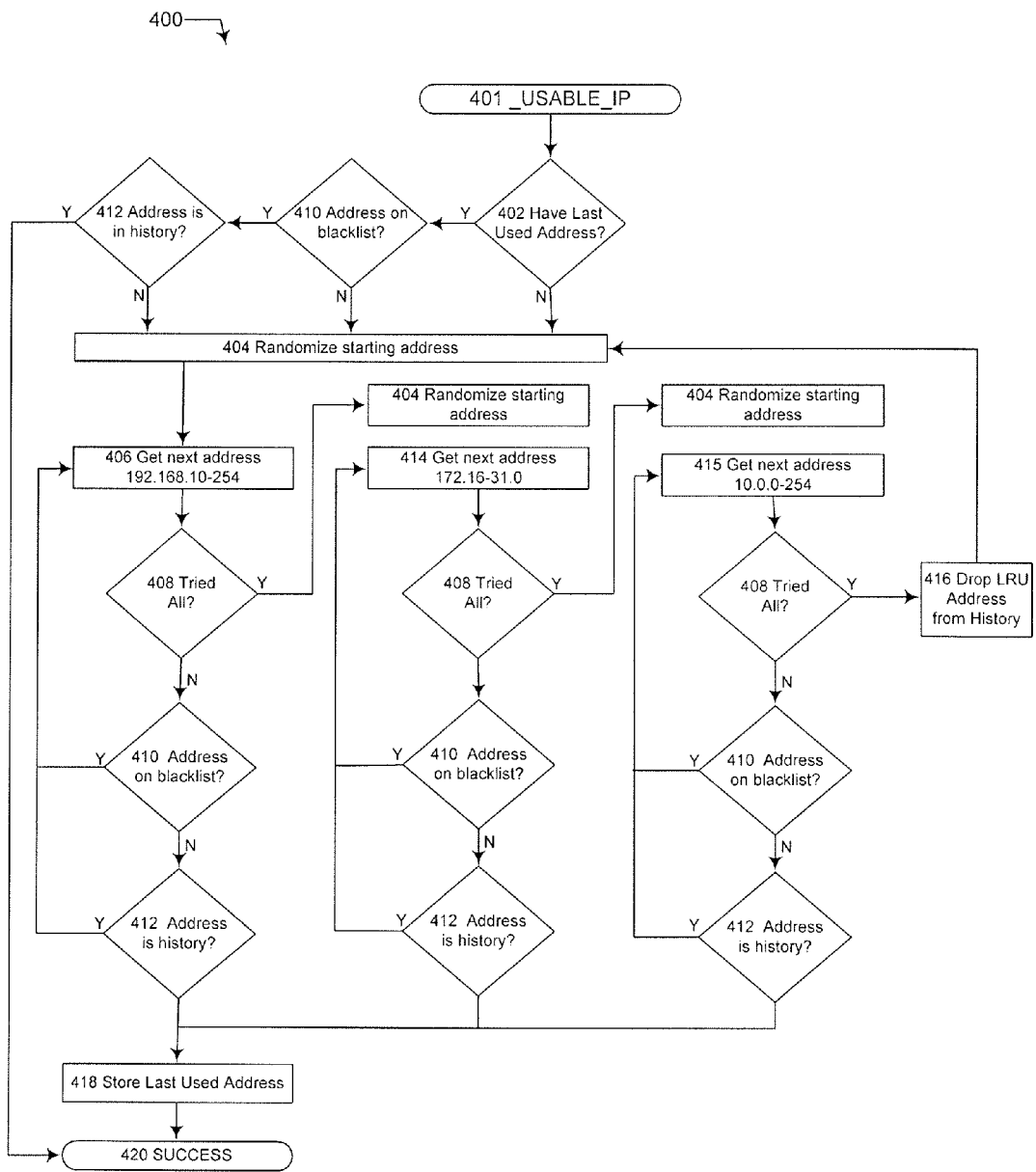
FIG. 4 illustrates an exemplary embodiment of the process used by the inventive NAT Router for providing IP Address allocation.

FIG. 4 illustrates an exemplary embodiment of this IP address range selection process 400. The process typically commences with step 401 by checking for a last-used address 402. If there is a last-used address range, this is then checked against a global blacklist 410 to determine if the address should not be used. The last-used address is the checked against a list of historically encountered upstream addresses 412. If both checks pass (e.g., not on the blacklist and within the listing of previously encountered upstream addresses), the last-used address is selected, and the process ends 420.

If either the blacklist or previously encountered upstream address test fails, then a new address range is needed for the attached network. To determine a new address range, the starting address is randomized 404 using one out of 256. This address is then iterated 406 over the private address ranges with, by way of example, 192.168.10 to 192.168.254, from the starting point, and again checking each number against the blacklist 410 and against a list of historically significant IP addresses 412.

As above, if the IP address selected passes both tests, the process succeeds 420. If either of the tests fails, the process iterates sequentially 406 to the next address within the allowable range, and so on. If all addresses are selected and tested 408, the process starts again 404 with another random start address 414 within the range, by way of example, 172.16 to 172.31.0. If that second address range also fails to yield a usable IP range, the process again 415 selects another random start 404 within the range, by way of example, 10.0.0 to 10.0.254. Similar to the above steps within the inventive process, if a usable address is found, it is stored 418 as the last-used address, and the process exits 420.

If the test again fails to identify a usable address range, the least recently seen addresses are dropped 416 from the history buffer, and the process re-starts 404. This closed loop processing ensures that the best address is assigned when starting a network, based on the entire history of the mobile device's interaction with upstream networks on any interface in use.

While certain exemplary embodiments have been disclosed and described, there are other system configurations that are equally possible with this hardware and system architecture, and it should be understood that the invention is not limited to those embodiments described. Those having ordinary skill in the art and access to the teachings provided herein will recognize additional applications and embodiments, further modifications, and certain substitution of equivalents, all of which are understood to be within the scope of the claimed inventive router configurations and systems and methods. Accordingly, the invention is not to be considered as limited by the foregoing description.

What we claim is:

1. A computer hosted network address translating router, comprising:
   (a) a network address translating router, said network address translating router determining and storing internet protocol address ranges;
   (b) a host computer communicatively connected to said network address translating router;
   (c) a plurality of local network adapters, each said local network adapter communicatively connected to said network address translating router;
   (d) a plurality of client devices, each said client device communicatively connected to a first subset of said local network adapters;
   (e) at least one remote network, each said remote network communicatively connected to a second subset of said local network adapters, the second subset of said local network adapters including a plurality of local network adapters;
   (f) at least one remote server, each said remote server communicatively connected to said at least one remote network; wherein said network address translating router manages network traffic to and from said at least one remote network and said at least one remote server by reassigning network connections between ones of the second subset of local network adapters, without restarting the network connections, if said network connections fail, become unavailable, or degrade in performance;
   (g) a performance monitor and load balancing element for (i) collecting actual performance data from the second subset of said local network adapters, and (ii) maintaining an average of a performance of the second subset of said local network adapters,
   wherein said network address translating router determines and stores the internet protocol address ranges by selecting internet protocol address ranges that do not conflict with upstream networks currently in use in a session, or likely to be used in connection with the session.

2. The computer hosted network address translating router, as described in claim 1, wherein said host computer is communicatively connected to said network address translating router by a virtual port.

3. The computer hosted network address translating router, as described in claim 1, wherein said plurality of local network adapters are communicatively connected to said network address translating router by a plurality of virtual ports.

4. The computer hosted network address translating router, as described in claim 1, wherein said client devices are grouped into one or more personal area networks.

5. The computer hosted network address translating router, as described in claim 1, wherein each said client device is communicatively connected to the first subset of said local network adapters by a local area network.

6. The computer hosted network address translating router, as described in claim 1, wherein said network address translating router monitors network traffic information across the second subset of said local network adapters, and uses said traffic information to allocate new connections to improve available interfaces.

7. The computer hosted network address translating router, as described in claim 1, wherein the performance monitor and load balancing element comprises a real-time performance monitor and load balancer.

8. The computer hosted network address translating router, as described in claim 7, wherein said network address translating router determines and provides real-time performance data to an end user.

9. The computer hosted network address translating router, as described in claim 7, wherein said network address translating router determines and provides real-time performance data to an end user in the form of aggregate performance.

10. The computer hosted network address translating router, as described in claim 1, wherein the performance monitor and load balancing element monitors and determines actual network traffic such that the computer hosted network address translating router may use one or more lower cost connections for a majority of network traffic, and one or more higher cost connections in situations where the lower cost connections are unavailable.

11. The computer hosted network address translating router, as described in claim 1, wherein said network address translating router records and uses historical connections to allocate local network addresses based upon past and present upstream network connections.

12. A method for a computer hosted network address translating router to select internet protocol ("IP") address ranges for private address allocation, said method comprising the steps of:
   (a) determining the last used IP address range;
   (b) comparing said last used IP address range against a listing of IP address ranges not to be used;
   (c) comparing said last used IP address range against a listing of historically used upstream IP address ranges;
   (d) if said last used IP address range is not on said listing of IP address ranges not to be used or said listing of historically used upstream IP address ranges, then said network address translating router uses said last used IP address range;
   (e) if either said last used IP address range is on said listing of IP addresses ranges not to be used or said listing of historically used upstream IP address ranges, then randomly selecting a new IP address range; and (f) comparing said randomly selected new IP address range against said listing of IP address ranges not to be used;
(g) comparing said randomly selected new IP address range against a listing of historically used upstream IP address ranges;
(h) if said randomly selected new IP address range is not on said listing of IP address ranges not to be used or said listing of historically used upstream IP address ranges, then said network address translating router uses said new IP address range; and
(i) if either said randomly selected new IP address range is on said listing of IP address ranges not to be used or said listing of historically used upstream IP address ranges, then returning to step (d) and again random selecting a new IP address range, wherein said computer hosted network address translating router comprises:
(a1) a network address translating router;
(a2) a host computer communicatively connected to said network address translating router;
(a3) a plurality of local network adapters, each said local network adapter communicatively connected to said network address translating router;
(a4) a plurality of client devices, each said client device communicatively connected to a first subset of said local network adapters;
(a5) at least one remote network, each said remote network communicatively connected to a second subset of said local network adapters, the second subset of said local network adapters including a plurality of local network adapters;
(a6) at least one remote server, each said remote server communicatively connected to said at least one remote network; wherein said network address translating router manages network traffic to and from said at least one remote network and said at least one remote server by reassigning network connections between ones of the second subset of local network adapter, without restarting the network connections, if said network connections fail, become unavailable, or degrade in performance; and
(a7) a performance monitor and load balancing element for (i) collecting actual predominance data from the second subset of said local network adapters, and (ii) maintaining an average of a performance of the second subset of said local network adapters, wherein said network address translating router determines and stores the internet protocol address ranges by selecting internet protocol address ranges that do not conflict with upstream networks currently in use in a session, or likely to be used in connection with the session.

13. The method of claim 12, wherein the performance monitor and load balancing element monitors and determines actual network traffic such that the computer hosted network address translating router may use one or more lower cost connections for a majority of network traffic, and one or more higher cost connections in situations where the lower cost connections are unavailable.

14. The method for a computer hosted network address translating router to select internet protocol ("IP") address ranges, as described in claim 12, wherein the performance monitor and load balancing element comprises a real-time performance monitor and load balancer.

15. The method for a computer hosted network address translating router to select internet protocol ("IP") address ranges, as described in claim 14, wherein said computer hosted network address translating router determines and provides real-time performance data to an end user.

16. The method for a computer hosted network address translating router to select internet protocol ("IP") address ranges, as described in claim 14, wherein said computer hosted network address translating router determines and provides real-time performance data to an end user in the form of aggregate performance.

17. The method for a computer hosted network address translating router to select internet protocol ("IP") address ranges, as described in claim 14, wherein said computer hosted network address translating router determines and stores internet protocol address ranges.

18. The method for a computer hosted network address translating router to select internet protocol ("IP") address ranges, as described in claim 14, wherein said computer hosted network address translating router records and uses historical connections to allocate local network addresses based upon past and present upstream network connections.

* * * * *